United States Patent
Hino et al.

(10) Patent No.: US 10,680,481 B2
(45) Date of Patent: Jun. 9, 2020

(54) ROTARY ELECTRIC MACHINE

(71) Applicants: Tatsuro Hino, Tokyo (JP); Tomohiro Bessho, Tokyo (JP); Kazuyuki Iwamoto, Tokyo (JP); Hironori Tsuiki, Tokyo (JP); Shogo Okamoto, Tokyo (JP); Ken Nishikawa, Tokyo (JP); Masaya Inoue, Tokyo (JP)

(72) Inventors: Tatsuro Hino, Tokyo (JP); Tomohiro Bessho, Tokyo (JP); Kazuyuki Iwamoto, Tokyo (JP); Hironori Tsuiki, Tokyo (JP); Shogo Okamoto, Tokyo (JP); Ken Nishikawa, Tokyo (JP); Masaya Inoue, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 958 days.

(21) Appl. No.: 14/758,817

(22) PCT Filed: Feb. 27, 2013

(86) PCT No.: PCT/JP2013/055135
§ 371 (c)(1),
(2) Date: Jul. 1, 2015

(87) PCT Pub. No.: WO2014/132359
PCT Pub. Date: Sep. 4, 2014

(65) Prior Publication Data
US 2015/0349611 A1 Dec. 3, 2015

(51) Int. Cl.
*H02K 11/25* (2016.01)
*H02K 3/34* (2006.01)
(Continued)

(52) U.S. Cl.
CPC ............. *H02K 3/345* (2013.01); *H02K 1/148* (2013.01); *H02K 3/522* (2013.01); *H02K 11/25* (2016.01); *H02K 21/16* (2013.01)

(58) Field of Classification Search
CPC .... H02K 3/522; H02K 11/0047; H02K 11/25; H02K 1/148; H02K 3/345; H02K 11/00;
(Continued)

(56) References Cited

U.S. PATENT DOCUMENTS 6,153,954 A * 11/2000 Uchida ................. H02K 11/25
310/68 C
2009/0140614 A1* 6/2009 Heim ..................... H02K 11/25
310/68 C

FOREIGN PATENT DOCUMENTS

JP 334209 U 4/1991
JP 2008-306886 A 12/2008
(Continued)

OTHER PUBLICATIONS

Communication dated Dec. 23, 2016 from the State Intellectual Property Office of the P.R.C. in counterpart application No. 201380073871.X.
(Continued)

*Primary Examiner* — Naishadh N Desai
(74) *Attorney, Agent, or Firm* — Sughrue Mion, PLLC; Richard C. Turner

(57) ABSTRACT

Insulators are respectively disposed such that longitudinal directions of trunk portions are oriented in a radial direction of teeth, and so as to place bottom surfaces of the trunk portions alongside two axial end surfaces of the teeth, concentrated winding coils are configured by winding conductor wires so as to be wound in multiple layers around the teeth so as to pass through a concave space that is formed by the trunk portions and first and second flange portions at two axial ends of the teeth, the second flange portion is disposed
(Continued)

on an end surface of a core back of a stator core, and a temperature detecting element is installed by being inserted into an element insertion aperture that is formed on the second flange portion so as to be able to detect a temperature of a coil end of the concentrated winding coils.

24 Claims, 12 Drawing Sheets

(51) Int. Cl.
*H02K 3/52* (2006.01)
*H02K 1/14* (2006.01)
*H02K 21/16* (2006.01)

(58) Field of Classification Search
CPC .. H02K 3/34; H02K 3/52; G01K 7/00; G01K 7/42
See application file for complete search history.

(56) References Cited

FOREIGN PATENT DOCUMENTS

| JP | WO 2009154035 A1 | * | 12/2009 | ............. H02K 3/522 |
| JP | WO2011128732 A2 | * | 10/2011 | ............. H02K 11/25 |
| JP | 2011-254628 A | | 12/2011 | |
| JP | 2013-013191 A | | 1/2013 | |
| WO | 2009/154035 A1 | | 12/2009 | |

OTHER PUBLICATIONS

International Search Report of PCT/JP2013/055135 dated May 14, 2013 [PCT/ISA/210].

Communication dated Oct. 27, 2015 from the Japanese Patent Office in counterpart application No. 2015-502625.

* cited by examiner

ROTARY ELECTRIC MACHINE

CROSS REFERENCE TO RELATED APPLICATIONS

This application is a National Stage of International Application No. PCT/JP2013/055135, filed Feb. 27, 2013, the contents of which are incorporated herein by reference in its entirety.

TECHNICAL FIELD

The present invention relates to a rotary electric machine that includes a temperature detector element.

BACKGROUND ART

In rotary electric machines, the occurrence of damage to a stator coil due to excessive temperature increases has been prevented by installing a temperature detecting element that detects a temperature of the stator coil in a stator, and controlling an excitation current flowing to the stator coil based on the temperature detected by the temperature detecting element.

In the conventional electric motor that is described in Patent Literature 1, for example, an insulator that includes: a hollow tube portion; an inner end portion that is linked to one end of the tube portion; and an outer end portion on which a pair of coil grooves are formed that are linked to another end of the tube portion, and that extend in an axial direction in a vicinity of one side portion that is linked to the tube portion, is mounted such that a coil supporting portion of a tooth is passed through the tube portion, and the inner end portion and the outer end portion are pressed by a tip end portion and a yoke segment of the tooth. The stator coil is configured such that a conductor wire is wound onto the tube portion so as to pass through one coil groove, and the temperature detecting element is disposed so as to be able to detect the temperature of the stator coil by being press-fitted into the other coil groove.

However, in the conventional electric motor that is described in Patent Literature 1, because the outer end portion on which the coil grooves are formed is positioned on an inner circumferential side of the yoke segment, one problem has been that winding space inside the slots is reduced, reducing coil space factor, and making increases in output unachievable. Furthermore, because the temperature detecting element has a larger diameter than the conductor wire, and it is necessary to increase the wall thickness of the outer end portion to ensure the groove depth of the coil groove if the coil groove is used to hold the temperature detecting element, winding space inside the slots is further reduced, reducing coil space factor.

In addition, in the conventional electric motor that is described in Patent Literature 1, because the coil grooves are formed so as to extend in an axial direction in a vicinity of one side portion that is linked to the tube portion, the temperature detecting element that is inserted into the coil groove detects the temperature of a side of the stator coil near the tube portion, i.e., a coil inner layer portion. Because the temperature of the stator core is lower than the temperature of the stator coil, the temperature of the coil inner layer portion is generally lower than the temperature of a coil outer layer portion. Consequently, one problem has been that the temperature detecting element cannot detect the temperature of the coil outer layer portion of the stator coil, which is what should be controlled.

In consideration of such conditions, conventional stators have been proposed in which a trunk portion is disposed by inserting a rod-shaped portion into a gap between a coil end and a tooth from an inner circumferential side to hold a temperature detecting element such that the trunk portion contacts a surface of the coil end on the inner circumferential side (see Patent Literature 2, for example).

CITATION LIST

Patent Literature

Patent Literature 1: Japanese Patent No. 5019960 (Gazette)
Patent Literature 2: Japanese Patent Laid-Open No. 2010-273514 (Gazette)

SUMMARY OF THE INVENTION

Problem to be Solved by the Invention

In conventional stators such as that described in Patent Literature 2, because the temperature detecting element is disposed so as to contact the surface of the coil end on an inner circumferential side, the temperature of the coil outer layer portion can be detected without reducing the winding space inside the slots. However, because a trunk portion that holds the temperature detecting element is additionally required, some problems have been that the number of parts is increased, increasing manufacturing costs, and that reductions in size also cannot be achieved.

The present invention aims to solve the above problems and an object of the present invention is to provide an inexpensive, compact rotary electric machine that suppresses reduction of winding space inside slots, that holds a temperature detecting element in an insulator so as to enable detection of temperature in a coil outer layer portion, and that suppresses increases in the number of parts.

Means for Solving the Problem

In order to achieve the above object, according to one aspect of the present invention, there is provided a rotary electric machine including: a stator including: an annular stator core; and concentrated winding coils that are mounted to respective teeth of the stator core; and a rotor, insulators including: a trunk portion; and first and second flange portions that are linked to two longitudinal ends of an upper surface of the trunk portion, respectively being disposed such that longitudinal directions of the trunk portions are oriented in a radial direction of the teeth, and so as to place bottom surfaces of the trunk portions alongside two axial end surfaces of the teeth, and the concentrated winding coils being configured by winding conductor wires so as to be wound in multiple layers around the teeth so as to pass through a concave space that is formed by the trunk portions and the first and second flange portions at two axial ends of the teeth. The second flange portion of the first and second portions is disposed on an end surface of a core back of the stator core, and a temperature detecting element is installed by being inserted into an element insertion aperture that is formed on the second flange portion so as to be able to detect a temperature of a coil end of the concentrated winding coils.

Effects of the Invention

According to the present invention, because the insulators also function as holding members for the temperature detecting element, it is not necessary to dispose a member that holds the temperature detecting element separately, enabling the number of parts to be reduced, thereby enabling manufacturing costs to be reduced. Because the temperature detecting element is disposed so as to be inserted into the element insertion apertures that are formed on the second flange portions of the insulators, the rotary electric machine can be reduced in size. Because the second flange portions of the insulators that hold the temperature detecting element are disposed on end surfaces of the core back portions of the stator core, winding space inside the slots is not reduced, increasing coil space factor, and enabling increased output to be achieved in the rotary electric machine.

DESCRIPTION OF EMBODIMENTS

Preferred embodiments of a rotary electric machine according to the present invention will now be explained with reference to the drawings.

Embodiment 1

Figure 1:
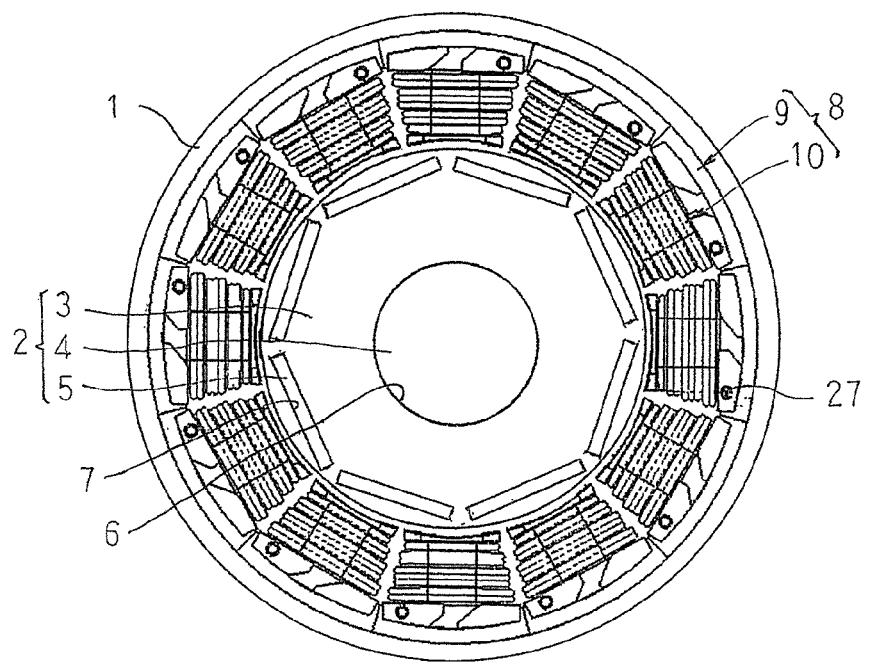
FIG. 1 is an end elevation that shows a rotary electric machine according to Embodiment 1 of the present invention.
Figure 2:
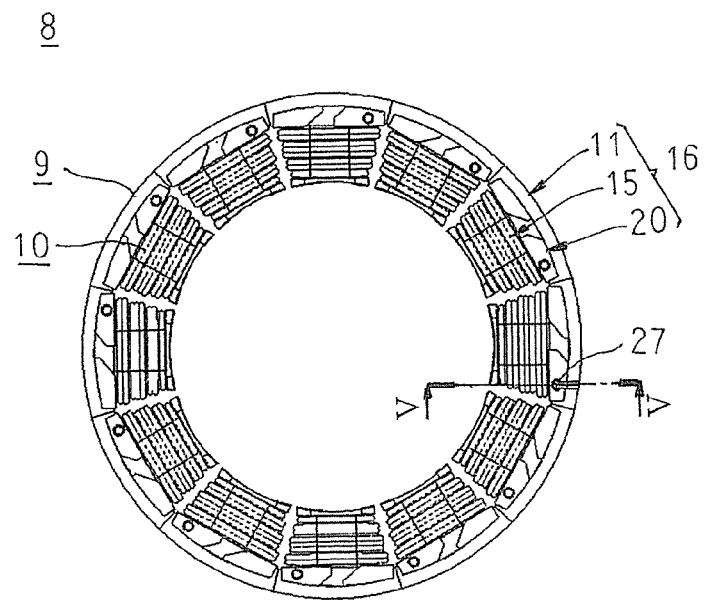
FIG. 2 is an end elevation that shows a stator in the rotary electric machine according to Embodiment 1 of the present invention.
Figure 3:
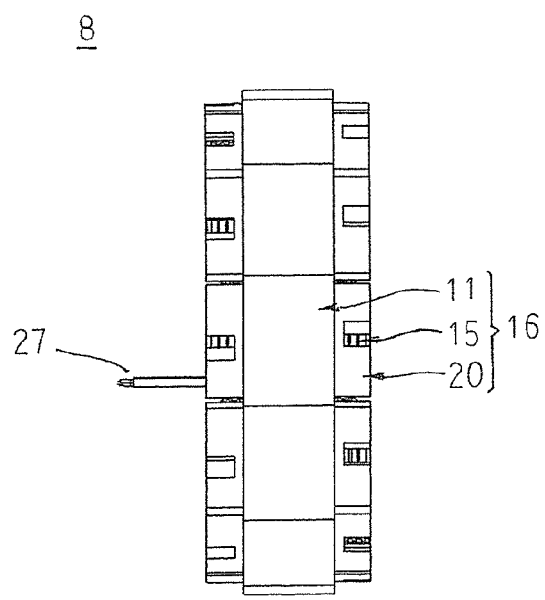
FIG. 3 is a side elevation that shows the stator in the rotary electric machine according to Embodiment 1 of the present invention.
Figure 4:
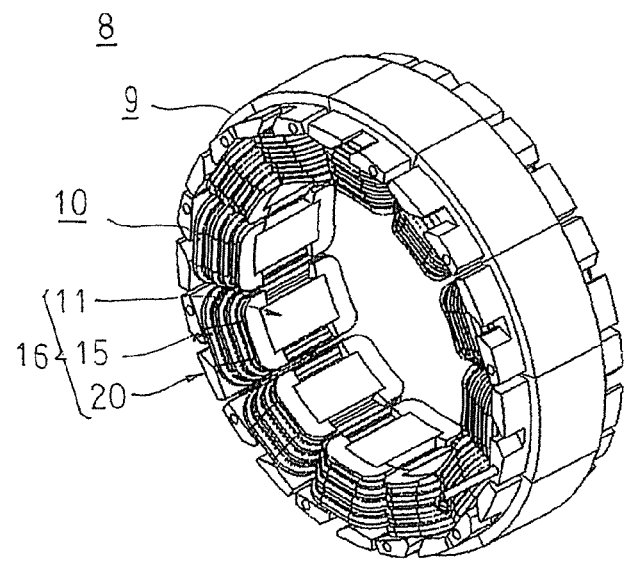
FIG. 4 is an oblique projection that shows the stator in the rotary electric machine according to Embodiment 1 of the present invention.
Figure 5:
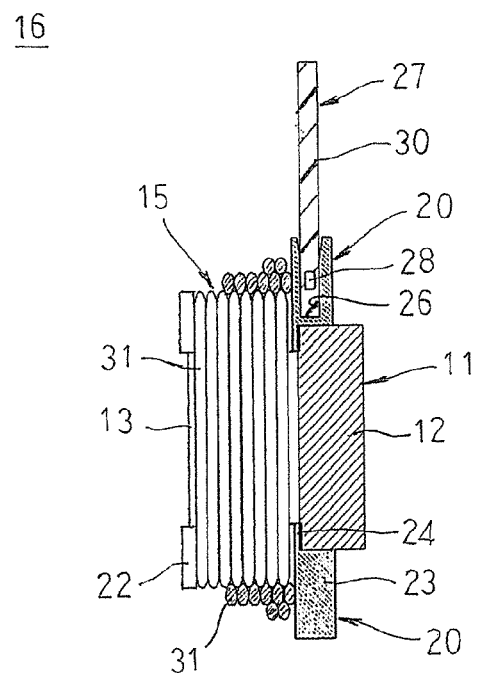
FIG. 5 is a cross section that is taken along Line V-V in FIG. 2 so as to be viewed in the direction of the arrows.
Figure 6:
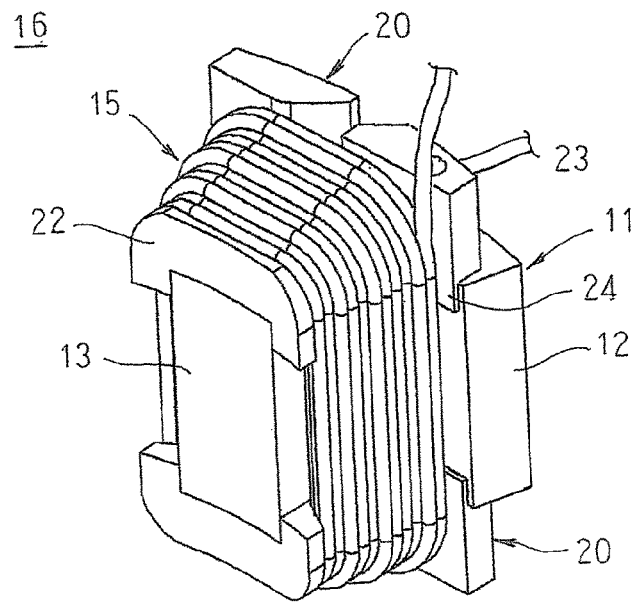
FIG. 6 is an oblique projection that shows a core assembly that constitutes the stator in the rotary electric machine according to Embodiment 1 of the present invention.
Figure 7:
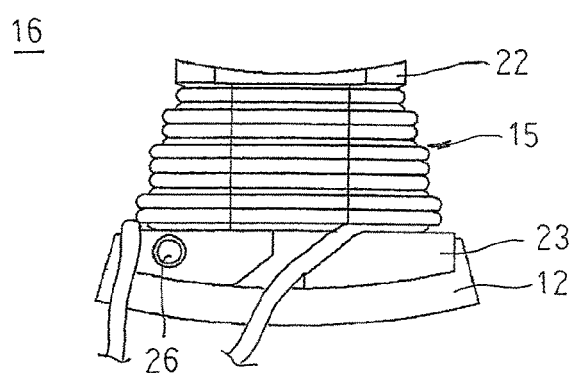
FIG. 7 is an end elevation that shows the core assembly that constitutes the stator in the rotary electric machine according to Embodiment 1 of the present invention.
Figure 8:
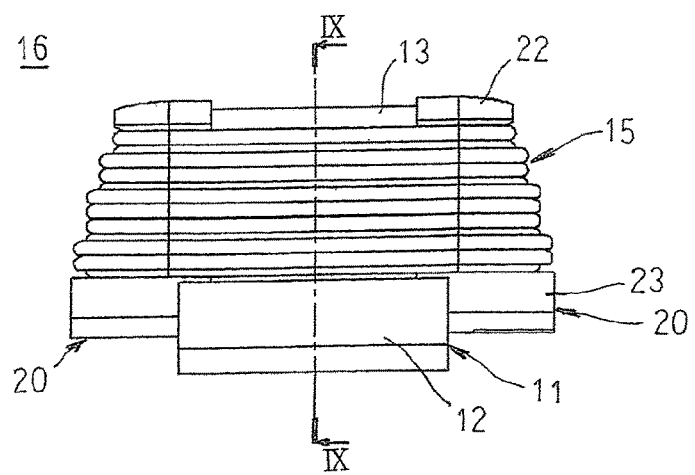
FIG. 8 is a side elevation that shows the core assembly that constitutes the stator in the rotary electric machine according to Embodiment 1 of the present invention.
Figure 9:
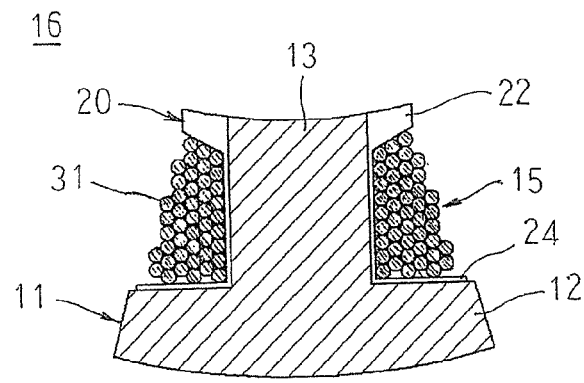
FIG. 9 is a cross section that is taken along Line IX-IX in FIG. 8 so as to be viewed in the direction of the arrows.
Figure 10:
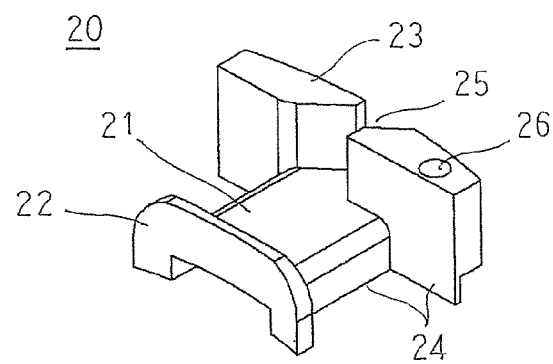
FIG. 10 is an oblique projection that shows an insulator that constitutes the stator in the rotary electric machine according to Embodiment 1 of the present invention.
Figure 11:
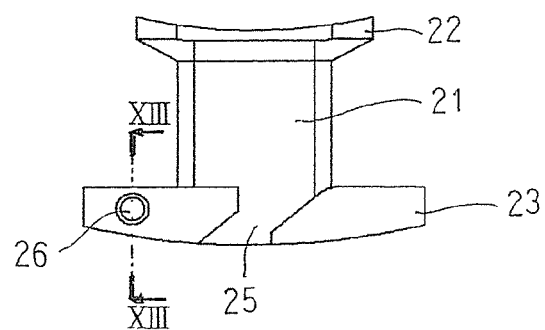
FIG. 11 is an end elevation that shows the insulator that constitutes the stator in the rotary electric machine according to Embodiment 1 of the present invention.
Figure 12:
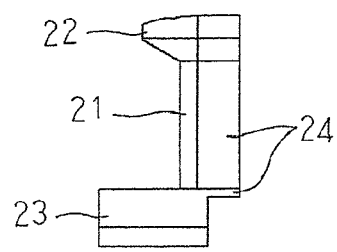
FIG. 12 is a side elevation that shows the insulator that constitutes the stator in the rotary electric machine according to Embodiment 1 of the present invention.
Figure 13:
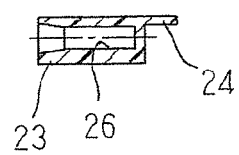
FIG. 13 is a cross section that is taken along Line XIII-XIII in FIG. 11 so as to be viewed in the direction of the arrows.
Figure 14:
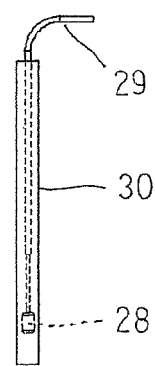
FIG. 14 is a front elevation that shows a temperature detecting element that constitutes the stator in the rotary electric machine according to Embodiment 1 of the present invention.
Figure 15:
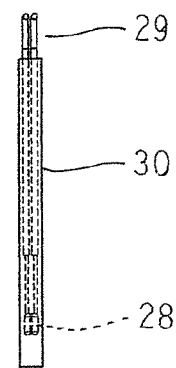
FIG. 15 is a side elevation that shows the temperature detecting element that constitutes the stator in the rotary electric machine according to Embodiment 1 of the present invention.

FIG. 1 is an end elevation that shows a rotary electric machine according to Embodiment 1 of the present invention, FIG. 2 is an end elevation that shows a stator in the rotary electric machine according to Embodiment 1 of the present invention, FIG. 3 is a side elevation that shows the stator in the rotary electric machine according to Embodiment 1 of the present invention, FIG. 4 is an oblique projection that shows the stator in the rotary electric machine according to Embodiment 1 of the present invention, FIG. 5 is a cross section that is taken along Line V-V in FIG. 2 so as to be viewed in the direction of the arrows, FIG. 6 is an oblique projection that shows a core assembly that constitutes the stator in the rotary electric machine according to Embodiment 1 of the present invention, FIG. 7 is an end elevation that shows the core assembly that constitutes the stator in the rotary electric machine according to Embodiment 1 of the present invention, FIG. 8 is a side elevation that shows the core assembly that constitutes the stator in the rotary electric machine according to Embodiment 1 of the present invention, FIG. 9 is a cross section that is taken along Line IX-IX in FIG. 8 so as to be viewed in the direction of the arrows, FIG. 10 is an oblique projection that shows an insulator that constitutes the stator in the rotary electric machine according to Embodiment 1 of the present invention, FIG. 11 is an end elevation that shows the insulator that constitutes the stator in the rotary electric machine according to Embodiment 1 of the present invention, FIG. 12 is a side elevation that shows the insulator that constitutes the stator in the rotary electric machine according to Embodiment 1 of the present invention, FIG. 13 is a cross section that is taken along Line XIII-XIII in FIG. 11 so as to be viewed in the direction of the arrows, FIG. 14 is a front elevation that shows a temperature detecting element that constitutes the stator in the rotary electric machine according to Embodiment 1 of the present invention, and FIG. 15 is a side elevation that shows the temperature detecting element that constitutes the stator in the rotary electric machine according to Embodiment 1 of the present invention. Moreover, a frame is omitted from FIGS. 2, 3, and 4. Furthermore, winding start end portions and winding finish end portions of conductor wires that constitute concentrated winding coils are omitted from FIGS. 1, 2, 3, and 4.

In FIG. 1, a rotary electric machine 100 includes: a shaft 4 that is rotatably supported by a frame 1; a rotor 2 that is fixed to the shaft 4 and that is rotatably disposed inside the frame 1; and a stator 8 that has: an annular stator core 9; and a stator coil 10 that is mounted onto the stator core 9, the stator core 9 being held by the frame 1, and the stator 8 being disposed so as to surround the rotor 2 so as to have a predetermined gap interposed.

The rotor 2 includes: a rotor core 3 that is produced by laminating and integrating electromagnetic steel plates that have been punched into predetermined shapes, for example; a shaft 4 that is press-fitted into and fixed to a shaft insertion aperture 6 that is formed so as to pass through a central axial position of the rotor core 3; and permanent magnets 5 that are inserted into each of eight magnet insertion apertures 7 that are each formed so as to pass through the rotor core 3, and that are arranged concyclically at a uniform angular pitch.

As shown in FIGS. 2 through 9, the stator 8 is constituted by an annular stator core 9, and a stator coil 10.

The stator core 9 is constituted by twelve core segments 11. Specifically, the core segments 11 are formed so as to have shapes that are obtained by dividing the stator core 9 into twelve equal sections circumferentially. The core segments 11 are produced by laminating and integrating a large number of electromagnetic steel plates that have been punched into identical shapes, for example, and have: a circular arc-shaped core back portion 12; and a tooth 13 that is disposed so as to extend radially inward from a circumferential center of an inner circumferential surface of the core back portion 12.

Insulators 20 are resin-molded bodies in which a nylon or polyphenylene sulfide (PPS) resin is used, for example. As shown in FIGS. 10 through 13, the insulators 20 have: a trunk portion 21 in which a cross section that is perpendicular to a longitudinal direction is an approximately rectangular shape in which rounding is applied to two corner portions on an upper portion side, and that is disposed such that the longitudinal direction is oriented in a radial direction of a tooth 13 and such that a bottom surface is parallel to an axial end surface of the tooth 13; an angular C-shaped first flange portion 22 that is linked to a first longitudinal end of the trunk portion 21, and that is disposed so as to cover the end surface of the tooth 13 near a tip end; and a thick tabular second flange portion 23 that is linked to a second longitudinal end of the trunk portion 21 so as to face the first flange portion 22, and that is disposed so as to cover an inner circumferential side of an end surface of a core back portion 12. In addition, thin skirt portions 24 are formed so as to extend for a predetermined length from inner-circumferential lower edge portions of two end portions in the width direction of the trunk portion 21, and from two wing portions of the second flange portion 23 on an opposite side from an upper surface of the trunk portion 21, and are disposed so as to cover a vicinity of end surfaces of the side surfaces of the teeth 13 and a vicinity of an end surface of the inner circumferential surface of the core back portion 12.

A lead-in groove 25 for passage of a conductor wire 31 is formed centrally in a width direction of the second flange portion 23 so as to pass through in a thickness direction. An element insertion aperture 26 is formed on a wing portion of the second flange portion 23 on a first side in the width direction so as to have an aperture direction in a direction that is perpendicular to a bottom surface of the second flange portion 23. Furthermore, a vicinity of an opening of the element insertion aperture 26 is formed into an inclined surface so as to have a splayed shape.

As shown in FIGS. 14 and 15, a temperature detecting element 27 has a detecting portion 28 and a lead wire 29, and is configured such that the detecting portion 28 is inserted into a tubular pipe 30 that functions as a protective member. Moreover, the temperature detecting element and the protective member may be integrated by insert molding by enveloping the detecting portion 28 to which the lead wire 29 is connected using a molten resin and solidify the resin. A negative temperature coefficient (NTC) thermistor that is produced by mixing and sintering oxides such as nickel, manganese, cobalt, iron, for example, can be used in the detecting portion 28.

Next, a method for assembling the stator 8 will be explained. To assemble the stator 8, pairs of insulators 20 are first disposed on end surfaces of the core segments 11 from two axial ends of the core segments 11 such that longitudinal directions of the trunk portions 21 are oriented in a radial direction of the teeth 13. Thus, the end surfaces of the teeth 13 are covered by the trunk portions 21 and the first flange portions 22, inner circumferential sides of the end surfaces of the core back portions 12 are covered by the second flange portions 23, and a vicinity of end surfaces of the side surfaces of the teeth 13 and a vicinity of end surfaces of the inner circumferential surface of the core back portions 12 are covered by the first flange portions 22 and the skirt portions 24.

Next, the conductor wires 31 are led in onto the trunk portions 21 through the lead-in grooves 25 that are formed on the second flange portions 23 of the insulators 20 at the first axial end, pass through concave spaces that are formed by the trunk portions 21 and the first and second flange portions 22 and 23 that are disposed on the two axial ends of the teeth 13 of the core segments 11, are wound around the teeth 13 in multiple layers, and then are led out at the first axial end. Specifically, a first layer is formed by winding the conductor wire 31 from a vicinity of the second flange portion 23 toward the first flange portion 22, and then a second layer is formed by winding toward the second flange portion 23, and this operation is repeated to obtain a concentrated winding coil 15 in which the conductor wire 31 is wound in multiple layers. Thus, as shown in FIGS. 6 through 8, a core assembly 16 in which a concentrated winding coil 15 is wound onto a core segment 11 is produced. Moreover, a copper round wire or an aluminum round wire that has a circular cross section that is coated with insulation is used for the conductor wire 31.

Next, the core assemblies 16 are arranged in an annular shape circumferentially by butting together circumferential end surfaces of the core back portions 12 of the core segments 11, and are press-fitted into and fixed to an annular frame 1, or are inserted inside and fixed to the frame 1 by shrinkage fitting, to assemble the stator 8. In addition, the temperature detecting element 27 is inserted into the element insertion apertures 26.

Here, the core segments 11 are arranged into an annular shape by butting together circumferential end surfaces of the core back portions 12 to configure the stator core 9. The core back portions 12 link circumferentially to configure the core back of the stator core 9, and spaces that are formed by the core back and adjacent teeth 13 constitute slots 14. The stator coil 10 is constituted by the twelve concentrated winding coils 15 that are wound onto the teeth 13 of the core segments 11. Portions of the concentrated winding coils 15 that protrude axially outward from the stator core 9 constitute coil ends of the stator coil 10.

Circumferential widths of the teeth 13 are constant in a radial direction, and the slots 14 have a fan-shaped cross-sectional shape in which a circumferential width becomes gradually narrower from a bottom portion toward an opening. Thus, as shown in FIG. 9, the concentrated winding coils 15 are wound such that there is an increasing number of layers from a vicinity of the tip ends of the teeth 13 toward the core back portions 12 to increase the space factor. Radial movement of the concentrated winding coils 15 is restricted by the first flange portions 22 and the second flange portions 23. Sides of the concentrated winding coils 15 that are wound into multiple layers contact inner circumferential surfaces of the second flange portions 23 near the core back portions 12. As shown in FIGS. 2 and 5, the detecting portion 28 of the temperature detecting element 27 is positioned radially outside a coil outer layer portion at a corner portion of the coil ends of the concentrated winding coils 15.

Because the trunk portions 21 cover the end surfaces of the teeth 13, and the skirt portions 24 cover a vicinity of end surfaces of side surfaces of the teeth 13 and a vicinity of end surfaces of the inner circumferential surfaces of the core back portions 12, there is no direct contact between the concentrated winding coils 15 and the core segments 11, ensuring insulation between the concentrated winding coils 15 and the core segments 11. Here, insulation between the concentrated winding coils 15 and the core segments 11 can be reliably ensured if the skirt portions 24 of the pairs of insulators 20 that are disposed on the two ends of the core segments 11 are extended so as to overlap with each other, or if insulating sheets are disposed between the skirt portions 24 of the pairs of insulators 20. In addition, insulation between the concentrated winding coils 15 can be ensured if insulating sheets are disposed between the adjacent concentrated winding coils 15.

The rotary electric machine 100 that is configured in this manner operates as an eight-pole, twelve-slot inner-rotor synchronous motor when electricity is supplied to the stator coil 10 from an external electric power supply.

According to Embodiment 1, because the insulators 20 also function as holding members for the temperature detecting element 27, it is not necessary to dispose a member that holds the temperature detecting element 27 separately, enabling the number of parts to be reduced, thereby enabling manufacturing costs to be reduced.

Because the temperature detecting element 27 is disposed so as to be inserted into the element insertion apertures 26 that are formed on the second flange portions 23 of the insulators 20, the rotary electric machine 100 can be reduced in size.

The second flange portions 23 of the insulators 20 that hold the temperature detecting element 27 are disposed on end surfaces of the core back portions 12 of the core segments 11. Thus, because the temperature detecting element 27 and the holding members are not disposed inside the slots 14, winding space inside the slots 14 is not reduced, increasing coil space factor, and enabling increased output to be achieved in the rotary electric machine 100.

Because the vicinity of the openings of the element insertion apertures 26 are formed so as to have a splayed shape, the temperature detecting element 27 is easily inserted into the element insertion apertures 26, increasing productivity.

Because the aperture directions of the element insertion apertures 26 are in an axial direction, the lead wires 29 of the temperature detecting element 27 do not project radially, enabling the radial dimensions of the rotary electric machine 100 to be reduced, which is effective in applications in which constraints on radial dimensions are severe.

If the element insertion apertures have openings on inner circumferential surfaces of the second flange portions 23, the conductor wire 31 may rub against the edge portions of the openings of the element insertion apertures during winding of the conductor wire 31, making damage to the insulating coatings more likely to occur. Thus, if the element insertion apertures have openings on the inner circumferential surfaces of the second flange portions 23, it is necessary to perform trimming of the edge portions of the openings of the element insertion apertures. In Embodiment 1, because the element insertion apertures 26 do not have openings on the inner circumferential surfaces of the second flange portions 23, a step of trimming of edge portions of the openings of the element insertion apertures is no longer required, increasing productivity.

The heat radiating area of the stator core 9 is large and the stator core 9 is fixed to a static member, improving heat radiating characteristics, and the temperature thereof is lower than that of the stator coil 10, which is a heat-generating part. Thus, in the concentrated winding coils 15 that constitute the stator coil 10, the temperature of the coil outer layer portions is higher than the temperature of the coil inner layer portions which are closer to the stator core 9 (the core segments 11). In Embodiment 1, because the detecting portion 28 of the temperature detecting element 27 is positioned radially outside a coil outer layer portion at a corner portion of the coil ends of the concentrated winding coils 15, the temperature of the coil outer layer portions, which have the highest temperatures in the concentrated winding coils 15, can be detected. Thus, the occurrence of damage to the stator coil 10 can be prevented by avoiding excessive temperature increases in the stator coil 10.

Now, rotary electric machines that require reductions in size and weight such as automotive electric motors, etc., often operate in a state of high coil temperature using conductor wire that is rated for heat resistance. If a conductor wire that is rated for heat resistance that is coated in an insulating coating such as polyimide, for example, is used, then the heat tolerance threshold of insulators 20 that are produced using nylon, PPS, etc., will be lower than the heat tolerance threshold of the insulating coating that is coated onto the conductor wire. As a result thereof, the insulators 20 may exceed the heat tolerance threshold even if the stator coil 10 is less than or equal to an allowable temperature.

In methods for measuring the temperature of the stator coil 10 directly, insulator temperature is estimated from a measured coil temperature, and the excitation current flowing to the stator coil 10 is controlled such that the estimated insulator temperature does not exceed a set temperature. The precision of the estimated value of the insulator temperatures is not high. Thus, because the set temperature is set to a lower temperature that is far enough away from the allowable temperature of the insulators 20 to allow for the accuracy of the estimate of the insulator temperature, and the excitation current that flows to the stator coil 10 is controlled such that the temperature of the insulators 20 can reliably be prevented from exceeding the allowable temperature, increases in output are unachievable.

In Embodiment 1, because the temperature detecting element 27 detects the temperature of the insulators 20 directly, the set temperature can be set to a temperature that is closer to the allowable temperature of the insulators 20. As a result thereof, a high-output rotary electric machine 100 can be achieved because the passage of electric current to the stator coil 10 can be controlled under operating conditions that are closer to an upper limit of the allowable temperature of the rotary electric machine 100.

Moreover, in Embodiment 1 above, a temperature detecting element is inserted into an element insertion aperture, but a temperature detecting element may be inserted into an element insertion aperture, and then the element insertion aperture may be filled with an adhesive. In that case, the temperature detecting element is fixed to the insulators firmly, enabling situations such as the temperature detecting element dislodging during operation to be prevented. Alternatively, the temperature detecting element may be inserted into the element insertion aperture, and then the element insertion aperture may be filled with a thermally conductive resin. In that case, the responsiveness of temperature detection by the temperature detecting element can be increased.

In Embodiment 1 above, the element insertion apertures are formed so as to have a bottom, but the element insertion apertures may pass through the first flange portions. In that case, during molding of the insulators, because a mold can be filled with a molten resin such that shafts that are disposed on a first mold are placed in contact with a second mold in order to form the element insertion apertures, rigidity of the molds is increased, preventing deformation of the shafts due to pressure during molding, and enabling dimensional precision of the insulators to be increased.

In Embodiment 1 above, a core segment group that is arranged into an annular shape is integrated by press-fitting into and fixing to a frame, but core segments may be arranged into an annular shape, and then integrated by fixing adjacent core segments to each other by welding.

In Embodiment 1 above, element insertion apertures are formed on wing portions of second flange portions on one circumferential side, but the position of formation of the element insertion apertures is not limited to the wing portions provided that the temperature detecting element that is inserted into the element insertion apertures can detect the temperature of a coil outer layer portion of the concentrated winding coils.

Embodiment 2

Figure 16:
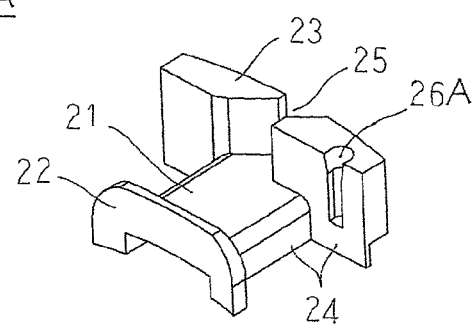
FIG. 16 is an oblique projection that shows an insulator that constitutes a stator in a rotary electric machine according to Embodiment 2 of the present invention.
Figure 17:
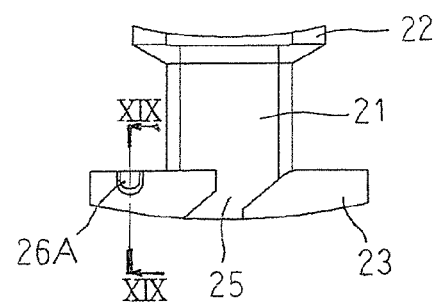
FIG. 17 is an end elevation that shows the insulator that constitutes the stator in the rotary electric machine according to Embodiment 2 of the present invention.
Figure 18:
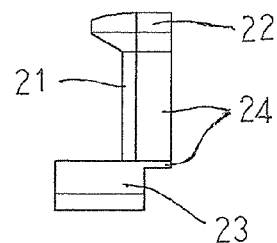
FIG. 18 is a side elevation that shows the insulator that constitutes the stator in the rotary electric machine according to Embodiment 2 of the present invention.
Figure 19:
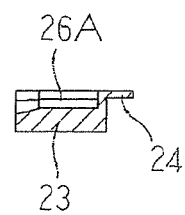
FIG. 19 is a cross section that is taken along Line XIX-XIX in FIG. 17 so as to be viewed in the direction of the arrows.
Figure 20:
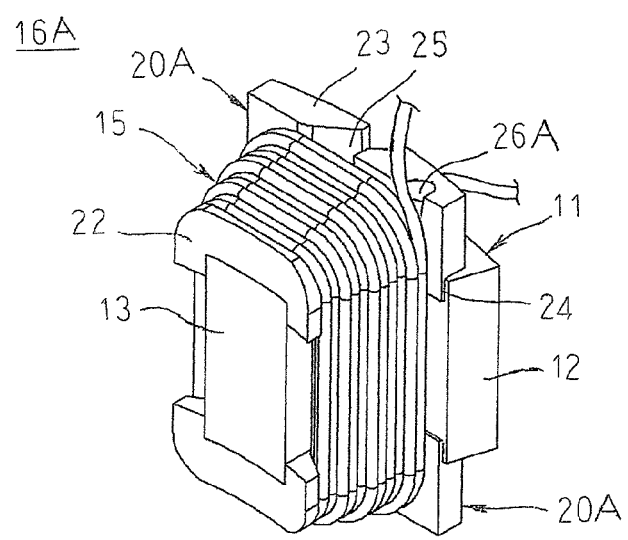
FIG. 20 is an oblique projection that shows a core assembly that constitutes the stator in the rotary electric machine according to Embodiment 2 of the present invention.
Figure 21:
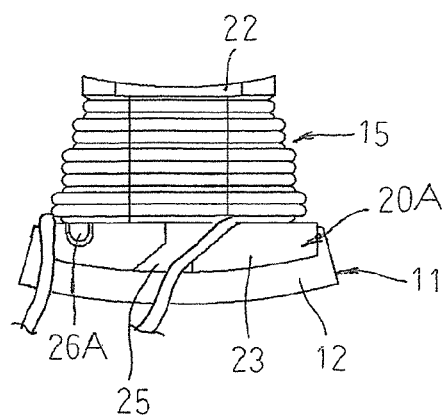
FIG. 21 is an end elevation that shows the core assembly that constitutes the stator in the rotary electric machine according to Embodiment 2 of the present invention.
Figure 22:
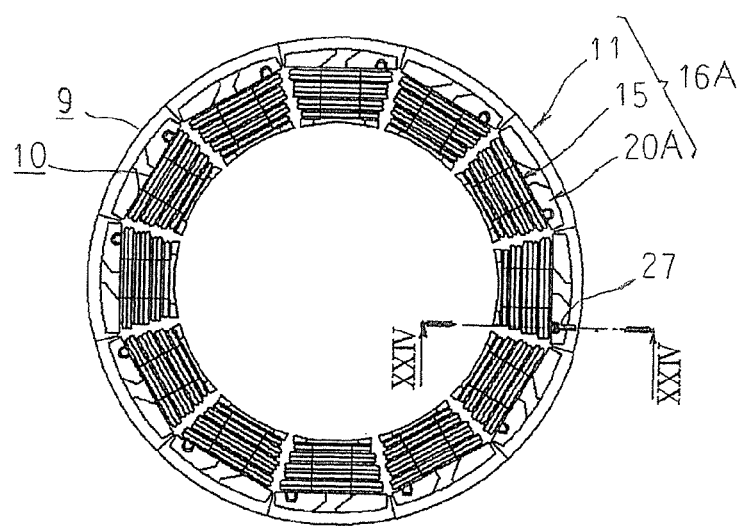
FIG. 22 is an end elevation that shows the stator in the rotary electric machine according to Embodiment 2 of the present invention.
Figure 23:
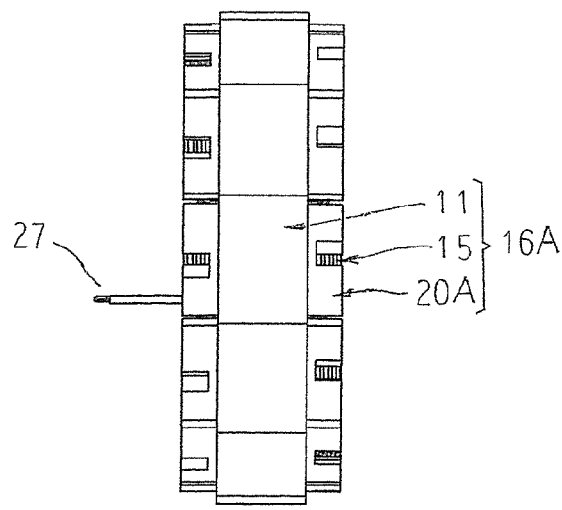
FIG. 23 is a side elevation that shows the stator in the rotary electric machine according to Embodiment 2 of the present invention.
Figure 24:
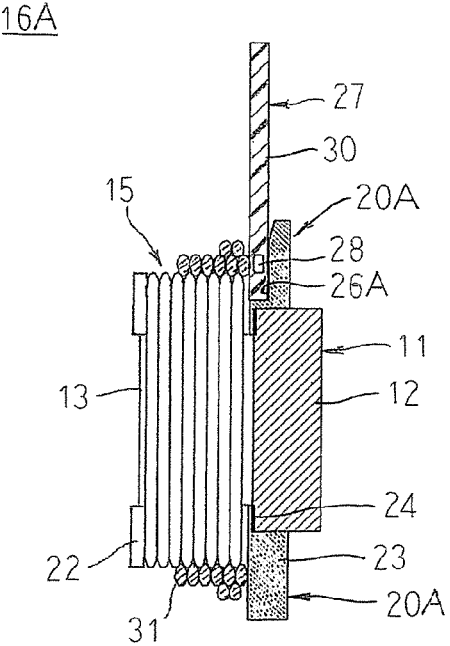
FIG. 24 is a cross section that is taken along Line XXIV-XXIV in FIG. 22 so as to be viewed in the direction of the arrows.

FIG. 16 is an oblique projection that shows an insulator that constitutes a stator in a rotary electric machine according to Embodiment 2 of the present invention, FIG. 17 is an end elevation that shows the insulator that constitutes the stator in the rotary electric machine according to Embodiment 2 of the present invention, FIG. 18 is a side elevation that shows the insulator that constitutes the stator in the rotary electric machine according to Embodiment 2 of the present invention, FIG. 19 is a cross section that is taken along Line XIX-XIX in FIG. 17 so as to be viewed in the direction of the arrows, FIG. 20 is an oblique projection that shows a core assembly that constitutes the stator in the rotary electric machine according to Embodiment 2 of the present invention, FIG. 21 is an end elevation that shows the core assembly that constitutes the stator in the rotary electric machine according to Embodiment 2 of the present invention, FIG. 22 is an end elevation that shows the stator in the rotary electric machine according to Embodiment 2 of the present invention, FIG. 23 is a side elevation that shows the stator in the rotary electric machine according to Embodiment 2 of the present invention, and FIG. 24 is a cross section that is taken along Line XXIV-XXIV in FIG. 22 so as to be viewed in the direction of the arrows. Moreover, winding start end portions and winding finish end portions of conductor wires that constitute concentrated winding coils are omitted from FIGS. 22 and 23.

In FIGS. 16 through 19, an element insertion aperture 26A is formed on a wing portion of a second flange portion 23 on a first side in a width direction so as to have an aperture direction in a direction that is perpendicular to a bottom surface of the second flange portion 23, and so as to have an opening on an inner circumferential surface of the second flange portion 23. Furthermore, a vicinity of an opening of the element insertion aperture 26A is formed into an inclined surface so as to have a splayed shape.

Insulators 20A that are configured in this manner are configured in a similar or identical manner to that of the insulators 20 except that the element insertion apertures 26A are formed instead of the element insertion apertures 26.

In Embodiment 2, pairs of insulators 20A are disposed on end surfaces of the core segments 11 from two axial ends of the core segments 11 such that longitudinal directions of the trunk portions 21 are oriented in a radial direction of the teeth 13. Next, the conductor wires 31 are led in onto the trunk portions 21 through the lead-in grooves 25 that are formed on the second flange portions 23 of the insulators 20A at the first axial end, are wound around the teeth 13 and the pairs of trunk portions 21 that are disposed on two axial ends thereof in multiple layers, and then are led out at the first axial end. Thus, as shown in FIGS. 20 and 21, a core assembly 16A in which a concentrated winding coil 15 is wound onto a core segment 11 is produced thereby.

Next, the core assemblies 16A are arranged in an annular shape circumferentially by butting together circumferential end surfaces of the core back portions 12 of the core segments 11, and are press-fitted into and fixed to the annular frame 1 (not shown) to assemble the stator 8A, as shown in FIGS. 22 through 24. In addition, the temperature detecting element 27 is inserted into the element insertion apertures 26A.

In Embodiment 2, because the temperature detecting element 27 is disposed so as to be inserted into the element insertion apertures 26A that are formed on the second flange portions 23 of the insulators 20A that are disposed on end surfaces of the core back portions 12 of the core segments 11, similar effects to those in Embodiment 1 above can also be achieved.

According to Embodiment 2, because the detecting portion 28 of the temperature detecting element 27 is in contact with a coil outer layer portion at a corner portion of the coil ends of the concentrated winding coils 15 through the pipe 30, as shown in FIG. 24, the responsiveness of temperature detection by the temperature detecting element 27 can be increased. Furthermore, because the temperature of the stator coil 10 can be detected directly, application to rotary electric machines in which the heat tolerance threshold of the stator coil 10 is lower than the heat tolerance threshold of the insulators 20A is particularly effective.

Embodiment 3

Figure 25:
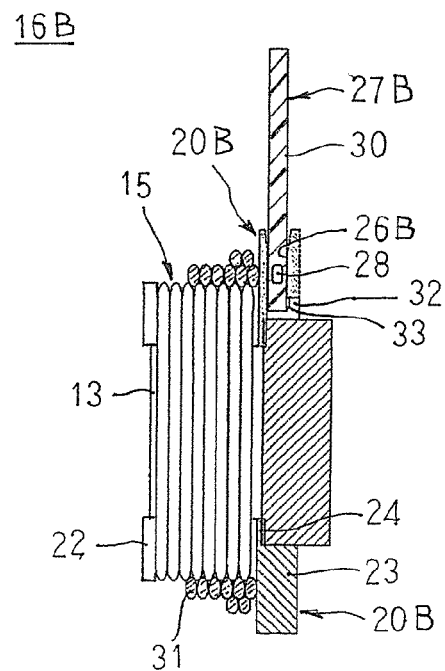
FIG. 25 is a cross section that shows a core assembly that constitutes a stator in a rotary electric machine according to Embodiment 3 of the present invention.

FIG. 25 is a cross section that shows a core assembly that constitutes a stator in a rotary electric machine according to Embodiment 3 of the present invention.

In FIG. 25, an element insertion aperture 26B is formed on a wing portion of a second flange portion 23 on a first side in a width direction so as to have an aperture direction in a direction that is perpendicular to a bottom surface of the second flange portion 23 so as to pass through the second flange portion 23. In addition, a holding aperture 32 that functions as a receiving portion is formed on the bottom surface of the second flange portion 23 so as to extend from an opposite side from the tooth 13 to the element insertion aperture 26B so as to have an aperture direction in a longitudinal direction of the tooth 13. A hook portion 33 that functions as an engaging portion is formed so as to protrude from a tip end of a pipe 30 of a temperature detecting element 27B.

Insulators 20B that are configured in this manner are configured in a similar or identical manner to that of the insulators 20 except that the element insertion apertures 26B and the holding apertures 32 are formed thereon.

In Embodiment 3, because the temperature detecting element 27B is disposed so as to be inserted into the element insertion apertures 26B that are formed on the second flange portions 23 of the insulators 20B that are disposed on end surfaces of the core back portions 12 of the core segments 11, similar effects to those in Embodiment 1 above can also be achieved.

In core assemblies 16B according to Embodiment 3, because the hook portion 33 on a tip end of the pipe 30 of the temperature detecting element 27B that is inserted into the element insertion apertures 26B enters a holding aperture 32, situations such as the temperature detecting element 27B disengaging during operation can be prevented. Because the temperature detecting element 27B can be fixed to the second flange portions 23 simply by inserting the temperature detecting element 27B into the element insertion apertures 26B, stator assembly is improved.

Moreover, in Embodiment 3 above, a temperature detecting element may be inserted into an element insertion aperture, and then the element insertion aperture may also be filled with a thermally conductive resin or an adhesive.

Embodiment 4

Figure 26:
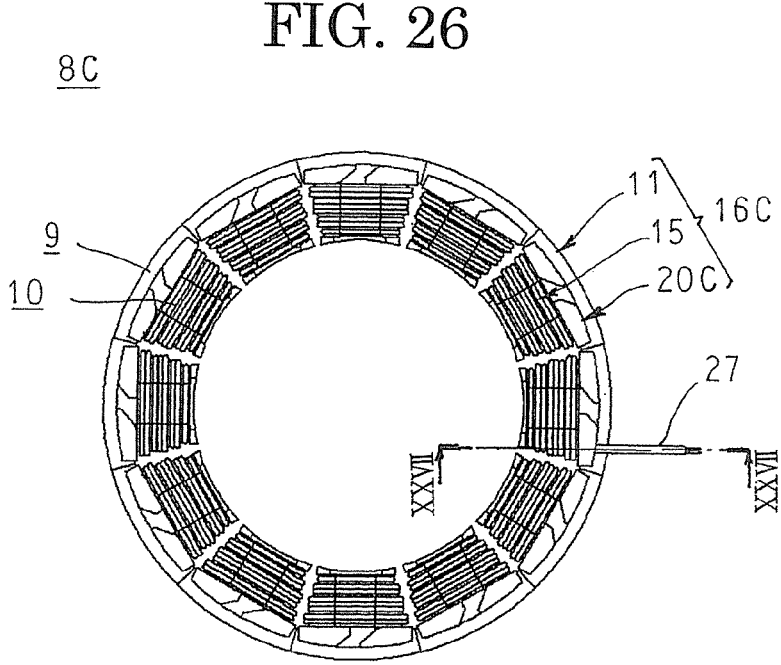
FIG. 26 is an end elevation that shows an insulator that constitutes a stator in a rotary electric machine according to Embodiment 4 of the present invention.
Figure 27:
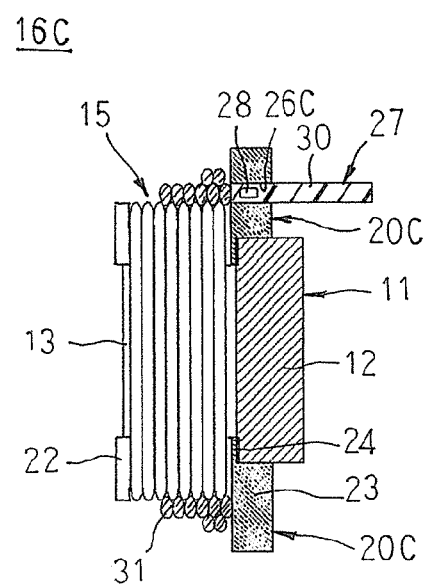
FIG. 27 is a cross section that is taken along Line XXVII-XXVII in FIG. 26 so as to be viewed in the direction of the arrows.

FIG. 26 is an end elevation that shows an insulator that constitutes a stator in a rotary electric machine according to Embodiment 4 of the present invention, and FIG. 27 is a cross section that is taken along Line XXVII-XXVII in FIG. 26 so as to be viewed in the direction of the arrows. Moreover, winding start end portions and winding finish end portions of conductor wires that constitute concentrated winding coils are omitted from FIG. 26.

In FIGS. 26 and 27, a stator 8C is configured such that core assemblies 16C are arranged in an annular shape circumferentially. The core assemblies 16C are produced by disposing pairs of insulators 20C on end surfaces of core segments 11, and winding conductor wires 31 a predetermined number of times. Element insertion apertures 26C are formed on wing portions of second flange portions 23 of the insulators 20C on a first side in a width direction so as to have aperture directions in a longitudinal direction of teeth 13 so as to pass through the second flange portions 23. A temperature detecting element 27 is inserted into the element insertion apertures 26C, and is disposed such that a detecting portion 28 of the temperature detecting element 27 is in contact with a coil outer layer portion at a corner portion of coil ends of the concentrated winding coils 15 through a pipe 30.

In Embodiment 4, because the temperature detecting element 27 is disposed so as to be inserted into the element insertion apertures 26C that are formed on the second flange portions 23 of the insulators 20C that are disposed on end surfaces of the core back portions 12 of the core segments 11, similar effects to those in Embodiment 1 above can also be achieved.

According to Embodiment 4, because the aperture directions of the element insertion apertures 26 are in radial direction, the lead wires 29 of the temperature detecting element 27 do not project axially, enabling the axial dimensions of the rotary electric machine to be reduced, which is effective in applications in which constraints on axial dimensions are severe.

Moreover, in Embodiment 4, the element insertion apertures are formed so as to pass radially through the second flange portions, but element insertion apertures may be formed so as to have openings on bottom surfaces of the second flange portions provided that they pass through the second flange portions radially. In that case, the insulating coating of the conductor wires will not be damaged because edge portions of the openings of the element insertion apertures that open onto the bottom surfaces of the second flange portions do not contact the conductor wires during winding.

Moreover, in each of the above embodiments, an inner-rotor electric motor has been explained, but similar or identical effects are also exhibited if the present invention is applied to an outer-rotor electric motor.

In each of the above embodiments, cases in which the present application has been applied to an electric motor have been explained, but similar or identical effects are also exhibited if the present application is applied to a generator.

In each of the above embodiments, an eight-pole, twelve-slot rotary electric machine has been explained, but it goes without saying that the number of poles and the number of slots are not limited to eight poles and twelve slots.

In each of the above embodiments, the teeth of the core segments are disposed so as to extend radially inward from the circumferential centers of the inner circumferential surfaces of the core back portions, but it is not necessary for the teeth to be disposed so as to extend from the circumferential centers of the inner circumferential surfaces of the core back portions. In other words, the lengths of the core back portions on the two circumferential sides of the teeth may be different provided that an annular stator core can be produced by arranging the core segments circumferentially such that the circumferential side surfaces of the core back portions are placed in contact with each other.

The invention claimed is:

1. A rotary electric machine comprising:
a stator comprising:
an annular stator core; and
concentrated winding coils that are mounted to respective teeth of said stator core; and
a rotor,
insulators comprising:
a trunk portion; and first and second flange portions that are linked to two longitudinal ends of an upper surface of said trunk portion,
respectively being disposed such that longitudinal directions of said trunk portions are oriented in a radial direction of said teeth, and so as to place bottom surfaces of said trunk portions alongside two axial end surfaces of said teeth, and
said concentrated winding coils being configured by winding conductor wires so as to be wound in multiple layers around said teeth so as to pass through a concave space that is formed by said trunk portions and said first and second flange portions at two axial ends of said teeth,
wherein:
said second flange portion of said first and second flange portions is disposed on an end surface of a core back of said stator core; and
a temperature detecting element is installed by being inserted into an element insertion aperture that is formed on said second flange portion so as to be able to detect a temperature of a coil outer layer portion of said concentrated winding coils.

2. The rotary electric machine according to claim 1, wherein:
said element insertion aperture comprises a receiving portion; and
said temperature detecting element comprises an engaging portion that engages in said receiving portion when said temperature detecting element is inserted into said element insertion aperture to prevent dislodging of said temperature detecting element.

3. The rotary electric machine according to claim 1, wherein a gap between said element insertion aperture and said temperature detecting element is filled with a resin.

4. The rotary electric machine according to claim 3, wherein said resin is an adhesive.

5. The rotary electric machine according to claim 1, wherein said element insertion aperture is formed on said second flange portion so as to be isolated from said concave space.

6. The rotary electric machine according to claim 5, wherein:
said element insertion aperture comprises a receiving portion; and
said temperature detecting element comprises an engaging portion that engages in said receiving portion when said temperature detecting element is inserted into said element insertion aperture to prevent dislodging of said temperature detecting element.

7. The rotary electric machine according to claim 5, wherein a gap between said element insertion aperture and said temperature detecting element is filled with a resin.

8. The rotary electric machine according to claim 7, wherein said resin is an adhesive.

9. The rotary electric machine according to claim 1, wherein said element insertion aperture is formed on said second flange portion so as to have an aperture in an axial direction.

10. The rotary electric machine according to claim 9, wherein:
said element insertion aperture comprises a receiving portion; and
said temperature detecting element comprises an engaging portion that engages in said receiving portion when said temperature detecting element is inserted into said element insertion aperture to prevent dislodging of said temperature detecting element.

11. The rotary electric machine according to claim 9, wherein a gap between said element insertion aperture and said temperature detecting element is filled with a resin.

12. The rotary electric machine according to claim 11, wherein said resin is an adhesive.

13. The rotary electric machine according to claim 9, wherein said element insertion aperture is formed on said second flange portion so as to be isolated from said concave space.

14. The rotary electric machine according to claim 13, wherein:
said element insertion aperture comprises a receiving portion; and
said temperature detecting element comprises an engaging portion that engages in said receiving portion when said temperature detecting element is inserted into said element insertion aperture to prevent dislodging of said temperature detecting element.

15. The rotary electric machine according to claim 13, wherein a gap between said element insertion aperture and said temperature detecting element is filled with a resin.

16. The rotary electric machine according to claim 15, wherein said resin is an adhesive.

17. The rotary electric machine according to claim 1, wherein said element insertion aperture is formed on said second flange portion so as to have an aperture direction in a radial direction.

18. The rotary electric machine according to claim 17, wherein:
said element insertion aperture comprises a receiving portion; and
said temperature detecting element comprises an engaging portion that engages in said receiving portion when said temperature detecting element is inserted into said element insertion aperture to prevent dislodging of said temperature detecting element.

19. The rotary electric machine according to claim 17, wherein a gap between said element insertion aperture and said temperature detecting element is filled with a resin.

20. The rotary electric machine according to claim 19, wherein said resin is an adhesive.

21. The rotary electric machine according to claim 17, wherein said element insertion aperture is formed on said second flange portion so as to be isolated from said concave space.

22. The rotary electric machine according to claim 21, wherein:
said element insertion aperture comprises a receiving portion; and
said temperature detecting element comprises an engaging portion that engages in said receiving portion when said temperature detecting element is inserted into said element insertion aperture to prevent dislodging of said temperature detecting element.

23. The rotary electric machine according to claim 21, wherein a gap between said element insertion aperture and said temperature detecting element is filled with a resin.

24. The rotary electric machine according to claim 23, wherein said resin is an adhesive.

* * * * *